US008554805B2

(12) United States Patent
Roesner et al.

(10) Patent No.: US 8,554,805 B2
(45) Date of Patent: Oct. 8, 2013

(54) METHODS AND SYSTEMS FOR IMPORTING SOURCE DATA

(75) Inventors: Kai-Michael Roesner, Stutensee-Blankenloch (DE); Gerald Pätzold, Heidelberg (DE)

(73) Assignee: SAP AG, Walldorf (DE)

( * ) Notice: Subject to any disclaimer, the term of this patent is extended or adjusted under 35 U.S.C. 154(b) by 1902 days.

(21) Appl. No.: 10/847,175

(22) Filed: May 17, 2004

(65) Prior Publication Data
US 2005/0257125 A1 Nov. 17, 2005

(51) Int. Cl.
*G06F 17/30* (2006.01)

(52) U.S. Cl.
USPC .......................................... 707/809; 707/602

(58) Field of Classification Search
USPC ............................. 707/4, 602, 809
See application file for complete search history.

(56) References Cited

U.S. PATENT DOCUMENTS

| | | | | |
|---|---|---|---|---|
| 5,570,291 | A * | 10/1996 | Dudle et al. ................... | 700/95 |
| 5,822,206 | A * | 10/1998 | Sebastian et al. ............... | 700/97 |
| 6,195,662 | B1 * | 2/2001 | Ellis et al. ................ | 707/103 R |
| 6,208,990 | B1 * | 3/2001 | Suresh et al. .................... | 707/6 |
| 6,381,600 | B1 * | 4/2002 | Lau .................. | 707/6 |
| 6,775,647 | B1 * | 8/2004 | Evans et al. ....................... | 703/7 |
| 6,782,200 | B2 * | 8/2004 | Geuss et al. .................... | 707/102 |
| 6,836,778 | B2 * | 12/2004 | Manikutty et al. ............. | 707/102 |
| 6,854,120 | B1 * | 2/2005 | Lo et al. ......................... | 719/311 |
| 6,964,053 | B2 * | 11/2005 | Ho et al. ........................ | 719/319 |
| 6,996,571 | B2 * | 2/2006 | McConnell ..................... | 707/101 |
| 7,017,112 | B2 * | 3/2006 | Collie et al. ................... | 715/513 |
| 7,315,868 | B1 * | 1/2008 | Turba ............................. | 707/797 |
| 2002/0143823 | A1 * | 10/2002 | Stevens .......................... | 707/523 |
| 2002/0188622 | A1 * | 12/2002 | Wallen et al. ............... | 707/104.1 |
| 2003/0093575 | A1 * | 5/2003 | Upton ............................ | 709/310 |
| 2003/0135825 | A1 * | 7/2003 | Gertner et al. ................. | 715/513 |
| 2003/0177137 | A1 * | 9/2003 | MacLeod et al. .............. | 707/102 |
| 2004/0205585 | A1 * | 10/2004 | McConnell ..................... | 715/513 |
| 2005/0021348 | A1 * | 1/2005 | Chan et al. ......................... | 705/1 |
| 2005/0021513 | A1 * | 1/2005 | Vedula et al. ...................... | 707/3 |

OTHER PUBLICATIONS

Microsoft Office 2003 Professional Edition, Beta 2, Version XI, Microsoft Developer Network, Jun. 2003.*
The StarOffice(tm) 6.0 Suite: New Features Guide, Sun Microsystems, v. 1.1, Jul. 2002, pp. 1-31.*
"New Microsoft Office Family Application Taps Power of Industry-Standard XML", http://www.microsoft.com/presspass/press/2002/oct02/10-09officefamilypr.mspx, Microsoft Coprporation, Oct. 2002-Feb. 2003, pp. 1-2.*
Westervelt, Robert, SearchSAP.com, http://web.archive.org/web/20050307093646/searchsap.techtarget.com/originalContent/0,289142,sid21_gci940785,00.html, archive.org, Dec. 11, 2003, pp. 1-2.*

(Continued)

*Primary Examiner* — Khanh Pham
(74) *Attorney, Agent, or Firm* — Finnegan, Henderson, Farabow, Garrett & Dunner, LLP

(57) ABSTRACT

Systems and methods are disclosed for importing source data. The disclosed systems and methods may include uploading the source data from at least one source system and translating the source data into command language commands. Furthermore, the disclosed systems and methods may include checking the command language commands for completeness or consistency and executing the command language commands to generate import data for at least one destination.

48 Claims, 14 Drawing Sheets

(56) References Cited

OTHER PUBLICATIONS

Tapadiya, P., "eXamin Data Integrator", Product Data Sheet published on web site, Software Labs, Mar. 2003, p. 1-2.*

Morris, "Improve the performance of the Lotus Connector for SAP", May 3, 2004, IBM, p. 1-7.*

Microsoft, "MSDN Universal Subscription", Apr. 2004, Shipment Content DVD List, DVD #2435.*

Bott et al, "Using Microsoft Ofifce 2000", Dec. 1999, Que Books, Special Edition p. 16, 40, 143, 144, 164, 174, 177, 180, 182, 183, 184, 204, 207-210, 330, 397, 400, 404, 405, 407, 451, 515, 516, 521, 582, 584, 585, 639, 644, 945-950, 952, 963, 964, 996, 1102-1103, 1140, 1142, 1145, 1146, 1233, 1249.*

Sonic Software Corporation, "Stylus Studio", Jun. 4, 2004, <http://web.archive.org/web/20040607095753/http://www.stylusstudio.com/xml_company_index.html>.*

Bott et al., "Using Microsoft Office 2000", Dec. 1999, Que Books, Special Edition, p. 192, 1167.*

* cited by examiner

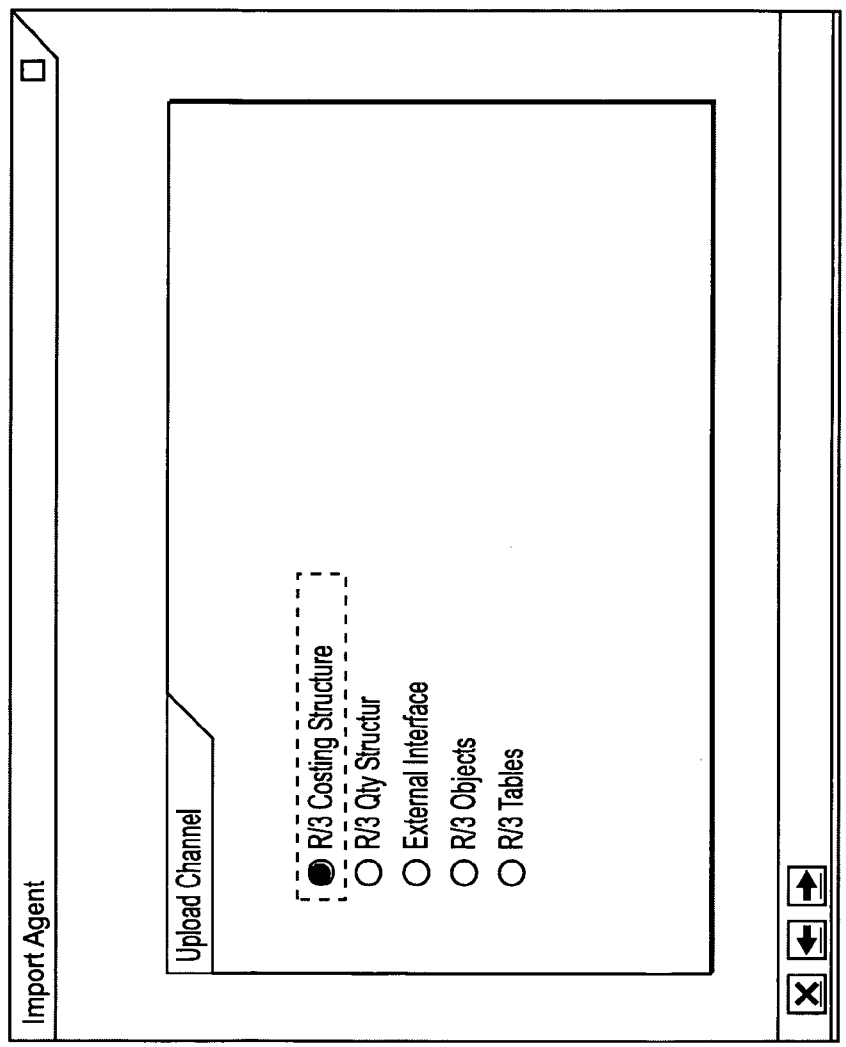

| Import Agent | | |
|---|---|---|
| Material | p-100 | to |
| Plnt | 1000 | to |
| Costing Version | | to |
| Costing Variant | | to |
| Valid From | | to |

☑ With qty structure
☐ Marked / Released

Maximum Number: 10
Src System: U9CCLNT800

FIG. 5D

| Ty... | Message Text |
|---|---|
| △ | Key field/ 1FB/VERSION for object of type KNOTEN not found |
| △ | Key field/ 1FB/VERSION for object of type KNOTEN not found |
| △ | Key field/ 1FB/VERSION for object of type KNOTEN not found |
| △ | Key field/ 1FB/VERSION for object of type KNOTEN not found |
| ○ | Position of type Delivery Costs at level 4 was skipped |
| ○ | Position of type X at level 4 was skipped |
| ○ | Position of type Subcontracting at level 3 was skipped |
| ○ | Position of type X at level 3 was skipped |
| △ | Key field/ 1FB/VERSION for object of type KNOTEN not found |

METHODS AND SYSTEMS FOR IMPORTING SOURCE DATA

BACKGROUND OF THE INVENTION

I. Field of the Invention

The present invention generally relates to methods and systems for importing source data. More particularly, the present invention relates to methods and systems for importing source data from one or more external sources using a central and/or consistent interface comprising, for example, a software-based framework.

II. Background Information

Importing source data is a process for taking source data comprising a particular format or structure and changing it into another format or structure. In some situations, an ad hoc approach to data importation is applied that depends on the source data. For example, for a given input format or structure, a particular application may be used for transforming the source data into another format or structure suitable for a predetermined environment or destination. If more than one source is utilized, then a separate application may be required for each of the possible source formats or structures. Thus, the conventional strategy is to provide a solution dependent upon the source data.

The above-mentioned approach is inefficient and can cause errors and/or other problems. For example, the conventional strategy does not provide a consistent approach for importing data. As a result, where multiple sources exist, data transformation errors may arise when importing the data. Further, with the conventional strategy, customization and maintenance is difficult since updates must be developed and applied for each source data format.

In view of the foregoing, there is a need for improved methods and systems for importing source data. Furthermore, there is a need for methods and systems for importing source data that are customizable and/or may be used with different source data formats.

SUMMARY OF THE INVENTION

Consistent with embodiments of the present invention, systems and methods are disclosed for importing source data. In accordance with one embodiment, a data import framework is provided for importing data from one or more sources. Embodiments of the invention also relate to systems and methods for importing source data, wherein the systems and methods provide a consistent framework for importing data and/or are customizable by a user.

In accordance with one embodiment, a method for importing source data comprises translating the source data into command language commands, checking the command language commands for at least one of completeness and consistency, and executing the command language commands wherein the executed command language commands generate import data.

According to another embodiment, a system for importing source data comprises a memory storage for maintaining a database and a processing unit coupled to the memory storage, wherein the processing unit is operative to translate the source data into command language commands, check the command language commands for at least one of completeness and consistency, and execute the command language commands wherein the executed command language commands generate import data.

In accordance with yet another embodiment, a computer-readable medium which stores a set of instructions which when executed performs a method for importing source data, the method executed by the set of instructions comprises translating the source data into command language commands, checking the command language commands for at least one of completeness and consistency, and executing the command language commands wherein the executed command language commands generate import data.

In accordance with yet another embodiment, a method for importing source data comprises uploading the source data, the source data comprising command language commands, checking the command language commands for at least one of completeness and consistency, and executing the command language commands wherein the executed command language commands generate import data.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings:

FIGS. 5A-5H are exemplary screen shots of GUIs for facilitating data import and user customization, consistent with an embodiment of the present invention;

DETAILED DESCRIPTION

Figure 1:
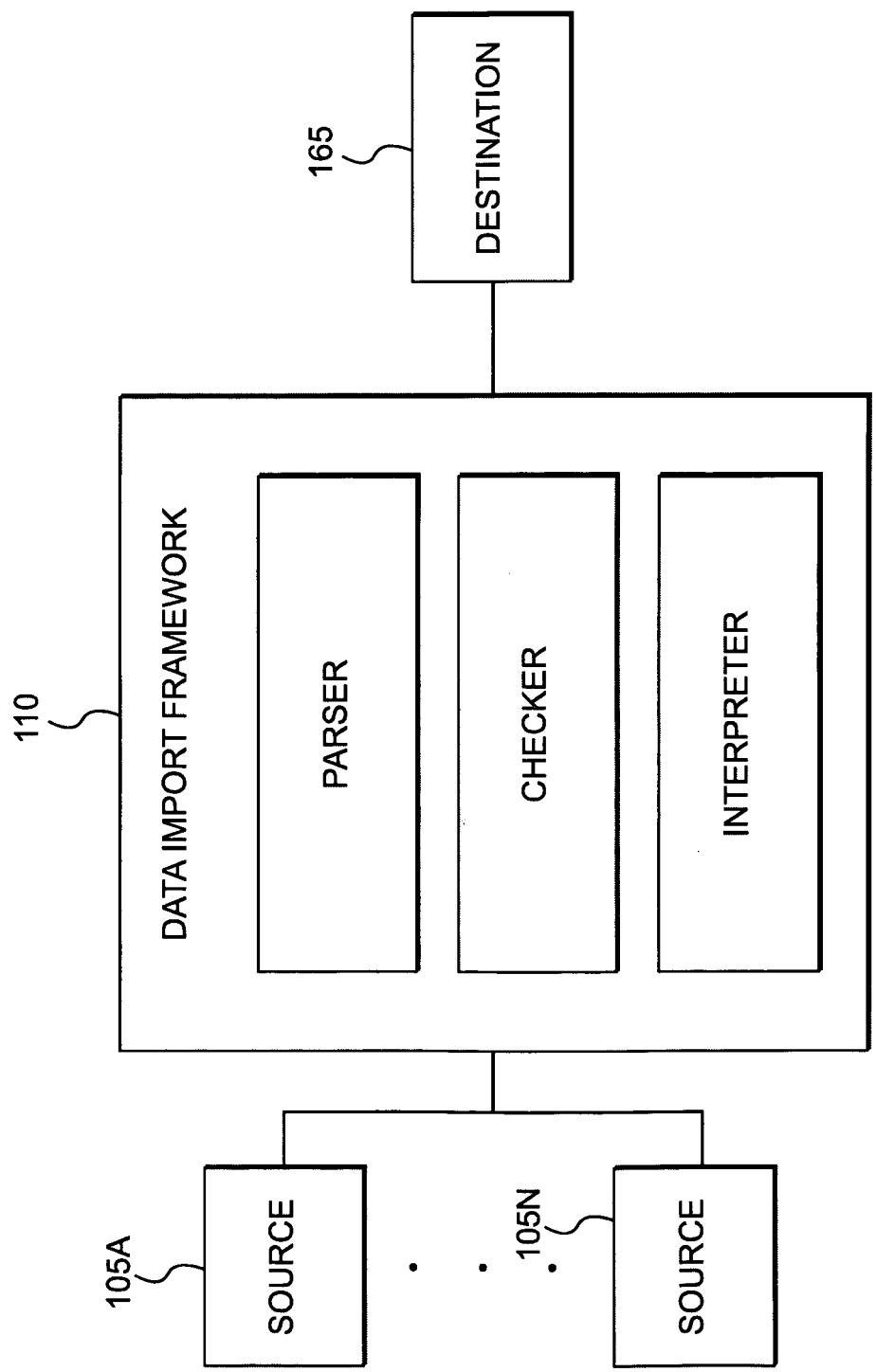
FIG. 1 is a block diagram of an exemplary system environment that includes a data import framework, consistent with an embodiment of the invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Systems and methods consistent with embodiments of the present invention import source data. The source data may be provided from one or more sources. The import of the source data may include transforming the format or structure of the source data to generate import data. The import data may have a predetermined format or structure that is suitable for a system environment or application program of at least one destination.

Embodiments of the invention also comprise a data import framework for transforming source data into import data. In one embodiment, the data import framework provides a central and/or consistent interface for importing data from one or more sources into a destination (see, e.g., FIG. 1). The data import framework may be implemented through any suitable combination of hardware, software and/or firmware. By way of example, in one embodiment, the data import framework is implemented with one or more software modules that are provided as part of a destination. In another embodiment, the data import framework is implemented with software module(s) that are provided separately from the destination. In yet another embodiment, the data import framework may be implemented as a central interface for transforming and importing data for a plurality of destinations.

As disclosed herein, the source data may be imported from a source to a destination using a consistent interface comprising, for example, a software-based framework. The source may comprise, for example, a source system, database or data processor (see, e.g., FIG. 2). The application program or system environment of the destination may provide specific functionality, such as financial or costing analysis. While embodiments of the invention are disclosed herein with reference to financial or costing solutions, the invention is not limited to such applications and embodiments of the invention may be applied to transform and/or import data into any application or system environment.

In accordance with another embodiment of the invention, the source data's terms and structures may be translated into the terms and structures of the destination. For example, appropriate objects in a financial program of the destination may be assigned to entities in the source data. Further, when importing hierarchical or network-like data from the source processor, appropriate networks may be formed for the financial program.

The data import framework may transform the source data, as described above. For example, the source data may be classified by the data import framework according to data types. The source data's classified types may then be assigned by the data import framework to types used by the destination. These assignments may be configured or customized by a user, for example. Moreover, the data import framework may offer programming interfaces to different levels, for example: (i) a specialized interface that may import data from an R/3 or NetWeaver system; (ii) a generic interface that may import data based on extensible markup language (XML); and (iii) a direct interface that may import data directly in a command language form. R/3 and NetWeaver are integrated suites of client/server applications from SAP AG, Walldorf, Germany. R/3 and NetWeaver may include information systems for manufacturing, distribution, order processing, accounting and human resources. XML is an open standard for describing data and may be used for defining data elements on an Internet page and business-to-business documents, for example.

For purposes of illustration, FIG. 1 is a block diagram of an exemplary system environment that includes a data import framework 110, consistent with an embodiment of the invention. As shown in FIG. 1, the data import framework may provide an interface for importing data from a plurality of sources 105A to 105N. Each of the sources 105A to 105N may provide data in one or more formats or structures (e.g., XML documents, data from an R/3 system, etc.). After transforming the data, data import framework 110 may generate import data for a destination 165. As disclosed herein, the destination may comprise one or more applications or system environments (e.g., financial or costing solutions). Consistent with embodiments, data import framework 110 may also be implemented to generate import data for a plurality of destinations (not shown in FIG. 1).

The components of FIG. 1 may be implemented using conventional hardware (e.g., servers, workstations, personal computers, etc.) and software (e.g., application programs or modules). Further, to provide connectivity and the communication of data, communication bus line(s) and/or network(s) may be employed. For example, each of the sources 105A to 105N may be connected to data import framework 110 by one or more networks, such as a local area network (LAN), a wide area network (WAN), an intranet or the Internet. Each destination 165 may also be connected to data import framework 110 in a similar fashion.

Data import framework 110 may comprise a syntactical analyzer (a parser, for example), contextual analyzer (a checker, for example), and an interpreter, to import data from any one of external sources 105A to 105N into destination 165. Processing performed by data import framework 110 may include: (i) translating the data from at least one source into a command language (by the parser, for example); (ii) checking the translated commands for completeness or consistency (by the checker, for example); and (iii) executing the import command to generate import data (by the interpreter, for example). The import data may comprise, for example, data objects that are processed by the destination.

An embodiment consistent with the invention may comprise a system for transforming source data to generate import data. The system may comprise a memory storage for maintaining a database and a processing unit coupled to the memory storage. The processing unit may be operative to translate the source data into command language commands. Furthermore, the processing unit may be operative to check the command language commands for at least one of completeness and consistency. In addition, the processing unit may be operative to execute the command language commands wherein the executed command language commands generate import data.

Figure 2:
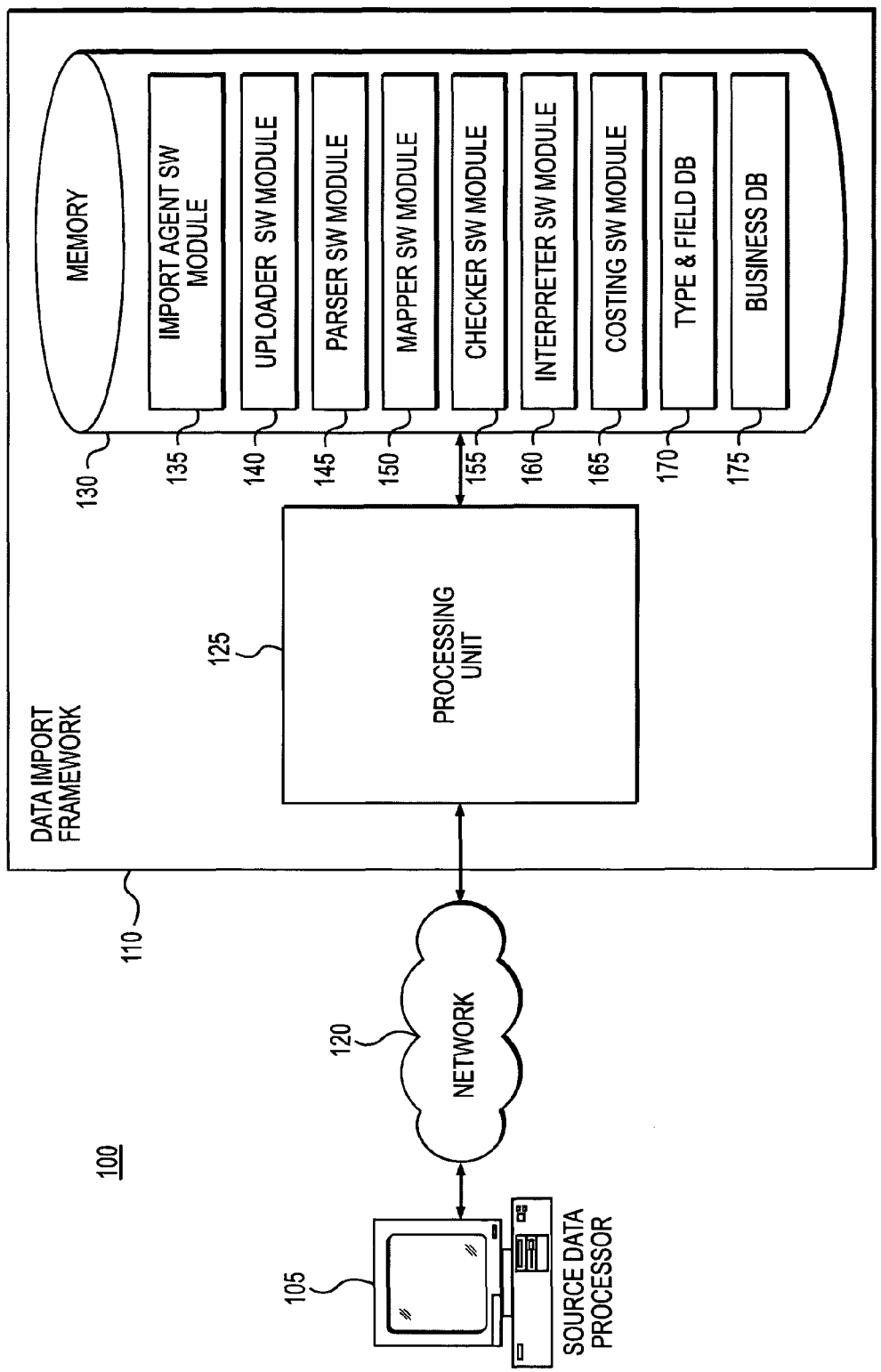
FIG. 2 is a block diagram of another exemplary system environment that includes a data import system, consistent with an embodiment of the present invention.

Consistent with an embodiment of the present invention, the aforementioned memory, processing unit, and other components may be implemented in a data import system, such as the embodiment of FIG. 1 or the exemplary data import system 100 of FIG. 2. Any suitable combination of hardware, software and/or firmware may be used to implement the memory, processing unit, or other components. By way of example, the memory, processing unit, or other components may be implemented with one or more sources 105 (such as a source data processor) and a data import framework 110, in combination with system 100. The aforementioned system and processors are exemplary and other systems and processors may comprise the aforementioned memory, processing unit, or other components, consistent with embodiments of the present invention.

By way of a non-limiting example, FIG. 2 illustrates system 100 in which the features and principles of the present invention may be implemented. As illustrated in the block diagram of FIG. 2, system 100 may include a source system in the form of source data processor 105, a data import framework 110, and a network 120. Consistent with embodiments of the invention, a user of system 100 may be an individual, for example, desiring to transform data using data import framework 110. A user of system 100 may also be an employee or representative of an organization, enterprise, or any other entity having such desires.

As shown in FIG. 2, data import framework 110 may include a processing unit 125 and a memory 130. Memory 130 may include: (i) an import agent software module 135; (ii) an uploader software module 140; (iii) a parser software module 145; (iv) a mapper software module 150; (v) a checker software module 155; (vi) an interpreter software module 160; (vii) a costing software module 165; (viii) a type and field database 170; and (ix) a business database 175. The software modules 135 through 165 residing in memory 130 may be executed on processing unit 125 and may access type and field database 170 and business database 175.

Consistent with embodiments of the present invention, the source data may be imported from source data processor 105 over network 120 to data import framework 110. Working in conjunction, import agent software module 135, uploader software module 140, parser software module 145, mapper software module 150, checker software module 155, and interpreter software module 160 may transform the source data received from source data processor 105 into a form usable by one or more application programs of the destination. In the exemplary embodiment of FIG. 2, the destination application program(s) may comprise, for example, costing software module 165, however, any application program may be used.

Consistent with the present invention, source data processor's 105 terms and structures may be translated into costing software module's 165 terms and structures. For example, appropriate objects in costing software module 165 may be assigned to entities in the source data supplied by source data processor 105. When importing hierarchical or network-like data from source data processor 105, appropriate networks may be formed for costing software module 165.

Figure 3:
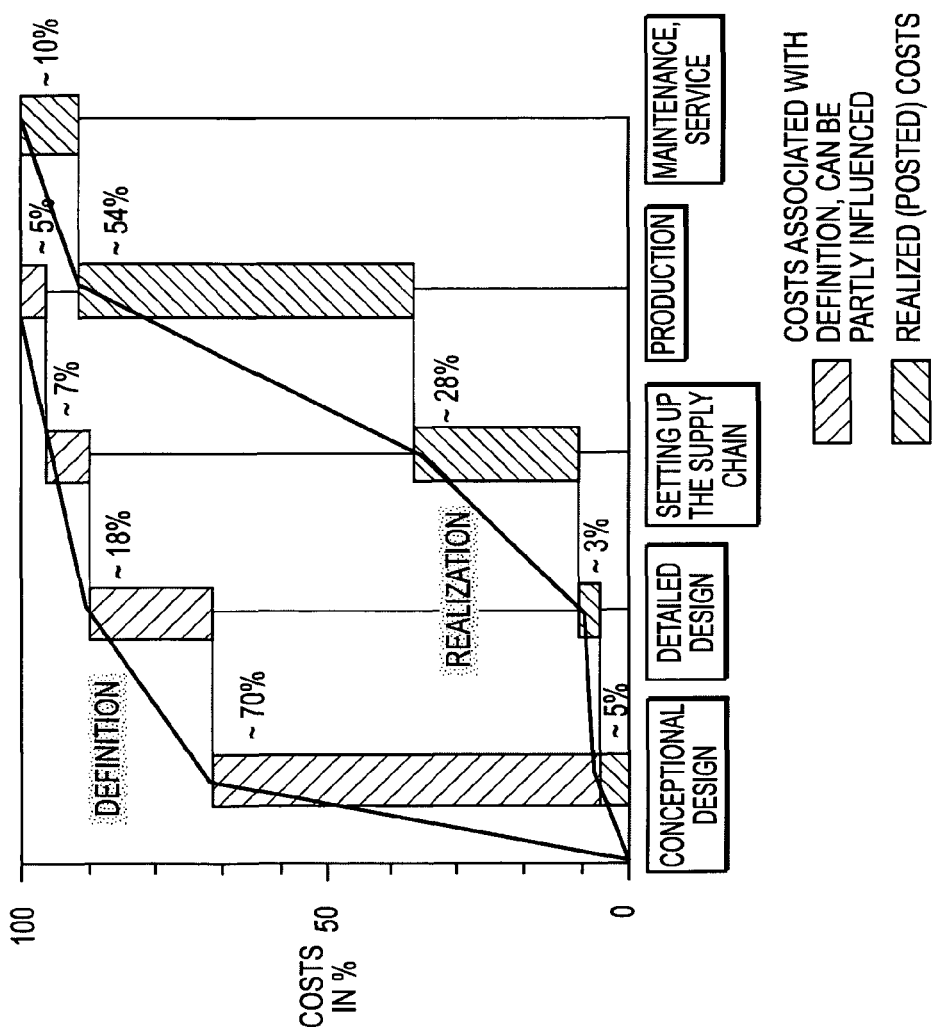
FIG. 3 is a diagram that illustrates an example of concurrent costing.

In accordance with one embodiment, the costing software module may be configured to use or provide concurrent costing. As illustrated in FIG. 3, concurrent costing may be a function for planning, monitoring, and optimizing the costs of new products during the planning, design, or offer phase. The costs of many products may largely be determined by engineering. Concurrent costing may be used in an early phase of the product life cycle because, at this point, the product costs may be approximately estimated with reference to an incomplete data basis. However, the course for the real costs may be set as they occur later. FIG. 3 shows which share of the costs associated with the definition have in the costs realized in the different phases of the product life cycle. As shown in FIG. 3, the total costs that occur may be influenced to a considerable extent with clever and constructive decisions in the product's design phase.

Concurrent costing may enable object types definition completely independent of firmly established data structures. The object types may be made of a combination of characteristics and key figures that may have been determined and the cost structure of which may be influenced by varying the characteristic values. For example, when producing a window frame, a pole for the locking mechanism may be needed. An object type pole that contains the characteristics material and plant may be defined. By varying these characteristics, the differences in costs in the planning phase may be assessed which result from using different materials that are suitable for the mechanism or from the origin of these materials from different plants.

Figure 4:
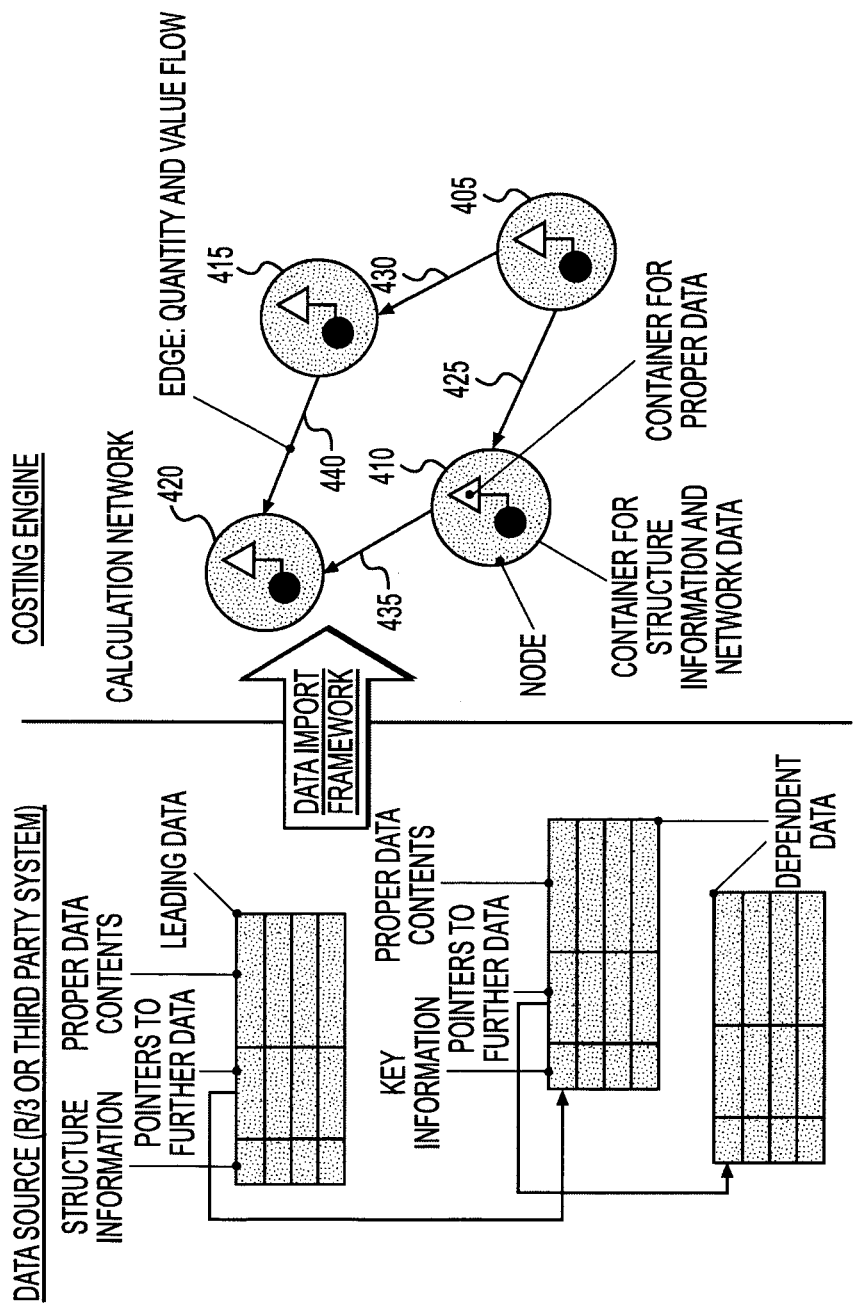
FIG. 4 is a diagram illustrating an exemplary implementation of a data import framework, consistent with an embodiment of the present invention.

As illustrated in the exemplary embodiment of FIG. 4, a data import framework consistent with the invention may manage a transformation from the source data, comprising for example, transforming tables into a costing engine network. In this example, the source data may be distributed over various tables. One table, for example, may contain leading data including R/3 cost estimate for materials. In addition, the leading data may point to dependent data over various levels of indirection. The data import framework may transform the source data into a costing engine network using a set of rules (type and field mappings, for example) that may have been customized. The costing engine network can in turn be used by costing software module 165. As shown in FIG. 4, after the transformation, the source data may no longer be distributed over a number of loosely coupled tables, for example, but may be organized in a clearly defined network comprising nodes and edges, for example. Moreover, the nodes may include an inner structure that may simplify subsequent processing by costing software module 165. For example, the nodes may comprise containers for structure information and network data.

Nodes and edges are terms that may be used to describe structural information in, for example, a costing engine network. For example, nodes may be connected by edges. The edges may be directional, for example, there may be a "sender" node and a "receiver" node. In the context of costing software module 165, these terms may be used to represent the components of products and activities that are needed to assemble them. For example, in FIG. 4, a node 405 may be a sender node, a node 420 may be a receiver node, and nodes 410 and 415 may be both sender and receiver nodes. Edges 425 and 430 may connect node 405 to nodes 410 and 415, respectively. Further, edges 435 and 440 may respectively connect nodes 410 and 415 to node 420.

Generally, parts, represented by nodes, maybe subdivided into further parts and activities. Particularly, no distinction may be made between a product and a part. The terms "sender" and "receiver" are defined with respect to a given edge, for example, the same node may be a sender node on one edge and a receiver node on another. Apart from this structural information, the nodes and edges may also have data containers to store data that identifies and characterizes them. For example, the source data may be in a table format similar to the tables of FIG. 4. In this example, the structural information as well as the proper data (e.g., object keys, quantities, amounts, etc.) may be encoded in the fields of the source data table lines. By using type and field mapping, as described below, the structural information and the proper data may be extracted from the source data tables and translated into command language commands by the parser software module.

Referring again to FIG. 2, import agent software module 135, when executed on processing unit 125, may display screens allowing user 115 to enter data queries and/or commands to source data processor 105 in order to import the source data. The sequence of these screens may follow, for example, a "wizard pattern" or another suitable graphical user interface (GUI) pattern. Such display screens or GUIs may be provided to enable a user to define and/or customize the import of data form a source system.

Figure 5A:
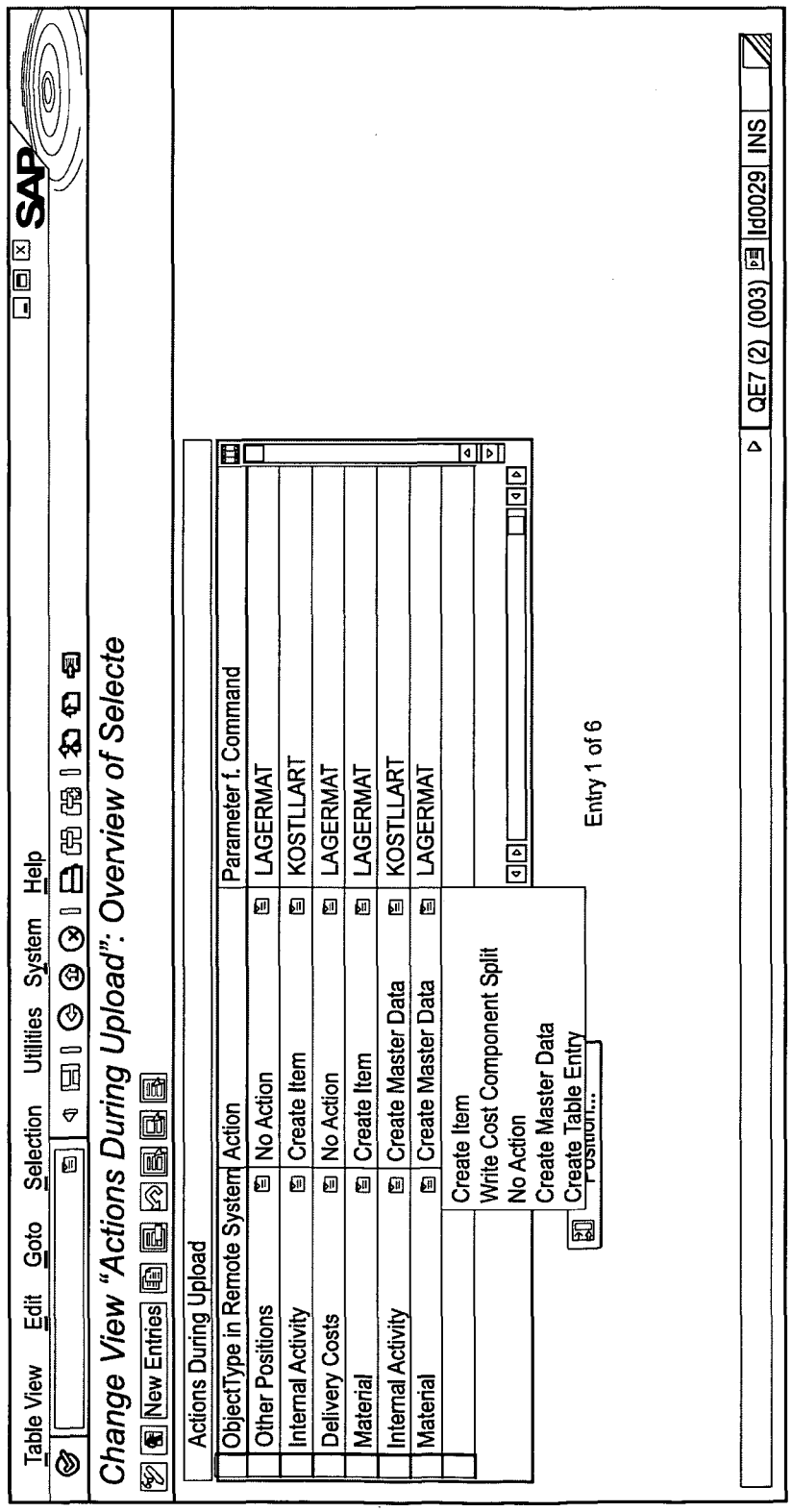
Figure 5B:
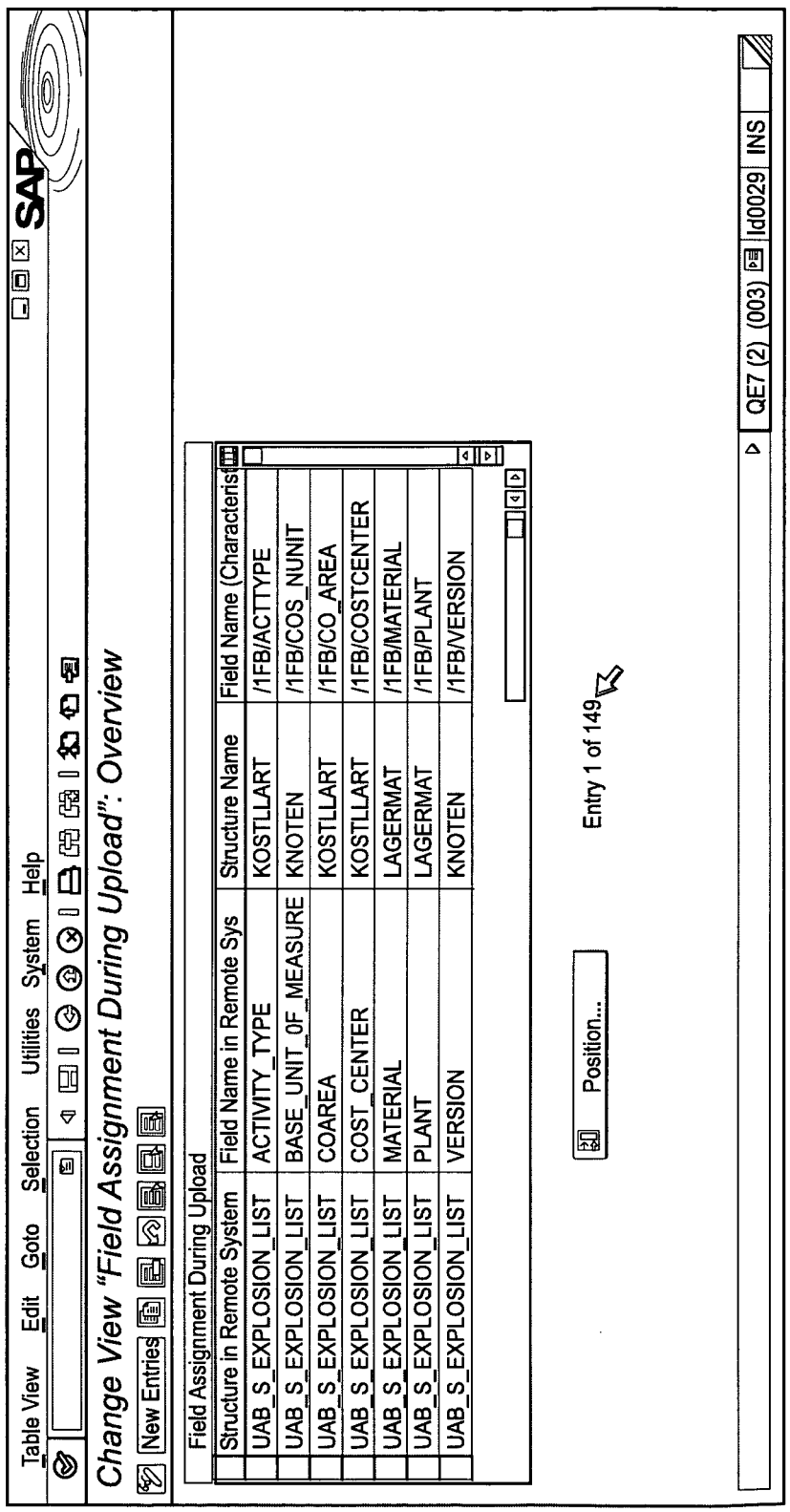

In accordance with an embodiment of the invention, FIGS. 5A-5H illustrate exemplary screen shots of GUIs for facilitating data import and user customization. The GUIs may enable a user to define and customize the data import. In general, FIGS. 5A and 5B show exemplary screens for configuring import agent software module 135 for an R/3 upload.

For example, as shown in FIG. 5A, a user may select objects in the remote system in the Object Type column, action for costing software module 165 in the Action column, and parameters for costing software module 165 in the Parameter column. Furthermore, as shown in FIG. 5B, a user may select structures and field names for the remote system in the left-most Structure and Field Name columns and may select structures and filenames for costing software module 165 in the right-most Structure and Field Name columns.

Figure 5E:
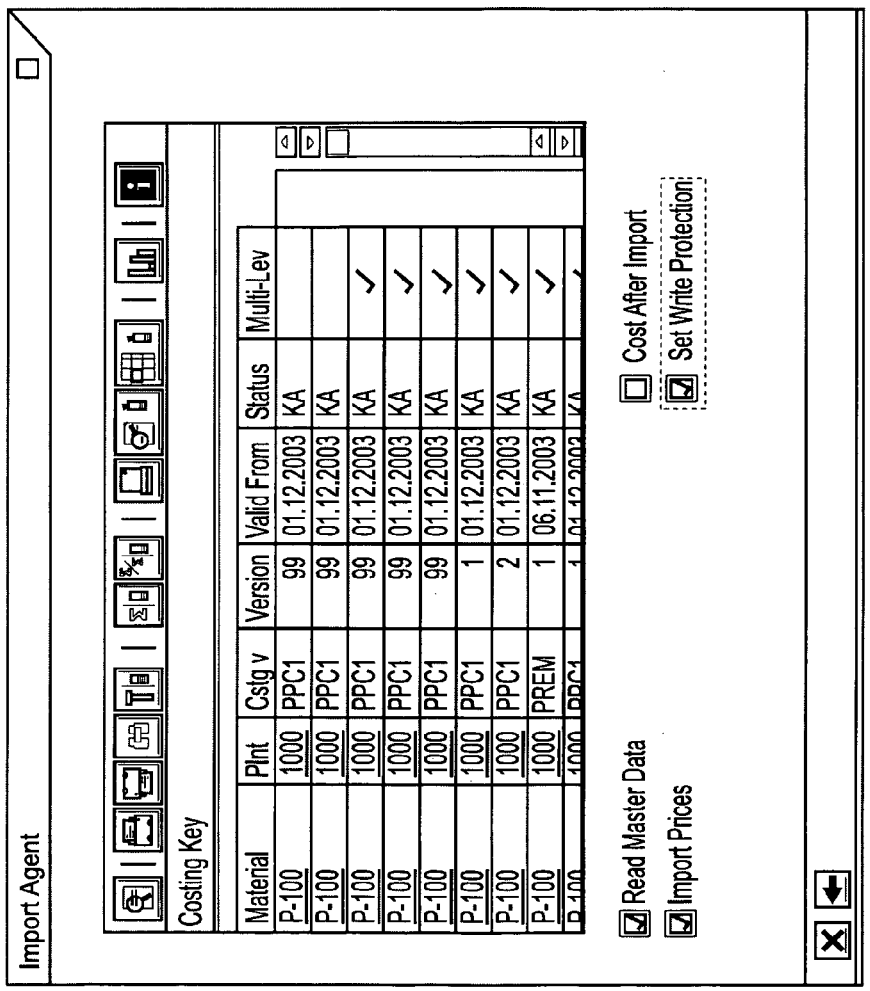
Figure 5G:
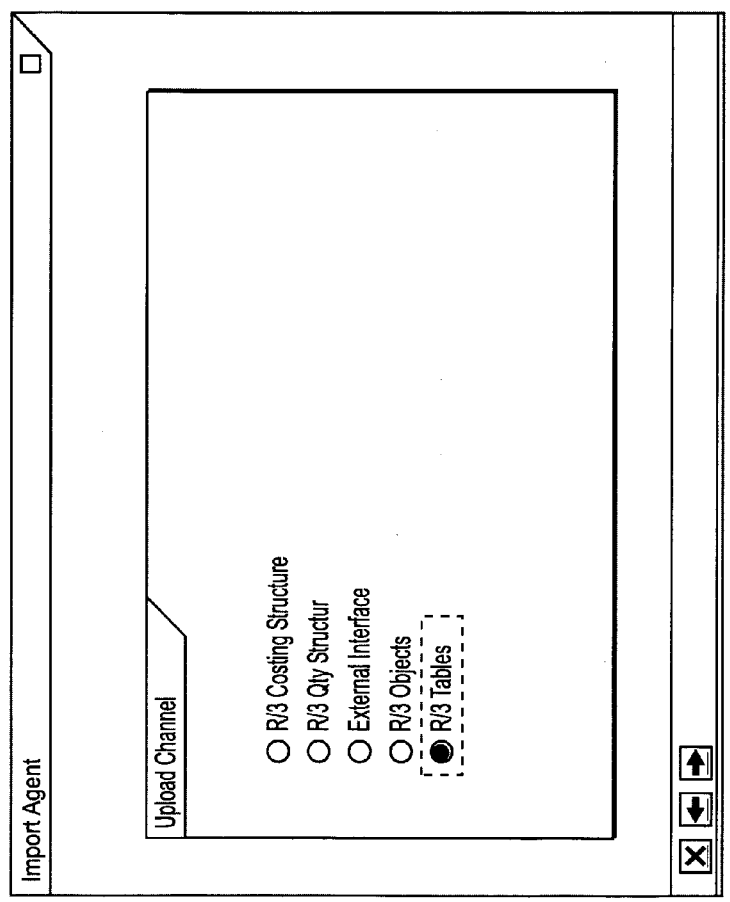
Figure 5H:
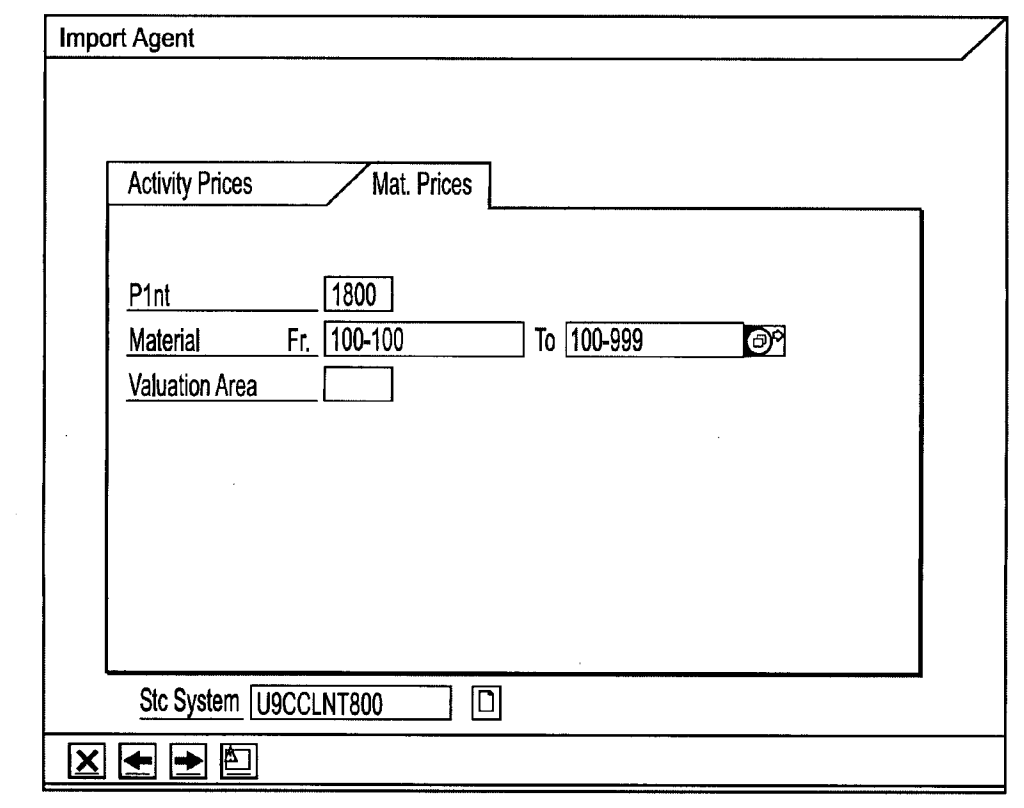

FIG. 5C shows an exemplary screen for selecting an upload channel. For example, the screens in FIG. 5C and FIG. 5 D shown how a user can select a particular upload channel and specify data to be imported respectively. FIG. 5E and FIG. 5F respectively show exemplary screens for data specification and selection. For example, FIG. 5E shows the data that meets the predefined criterion and FIG. 5F shows a log of the data import process. Furthermore, the screens shown in FIG. 5G and FIG. 5H shown how a user can select another upload channel and specify data to be imported in another upload similar to FIG. 5C and FIG. 5 D.

The data imported by import agent software module 135 may be in any format or working environment including, for example, R/3 and XML data. The aforementioned formats are exemplary and others may be used. Once import agent software module 135 imports the source data, the source data may be supplied to uploader software module 140.

Figure 6:
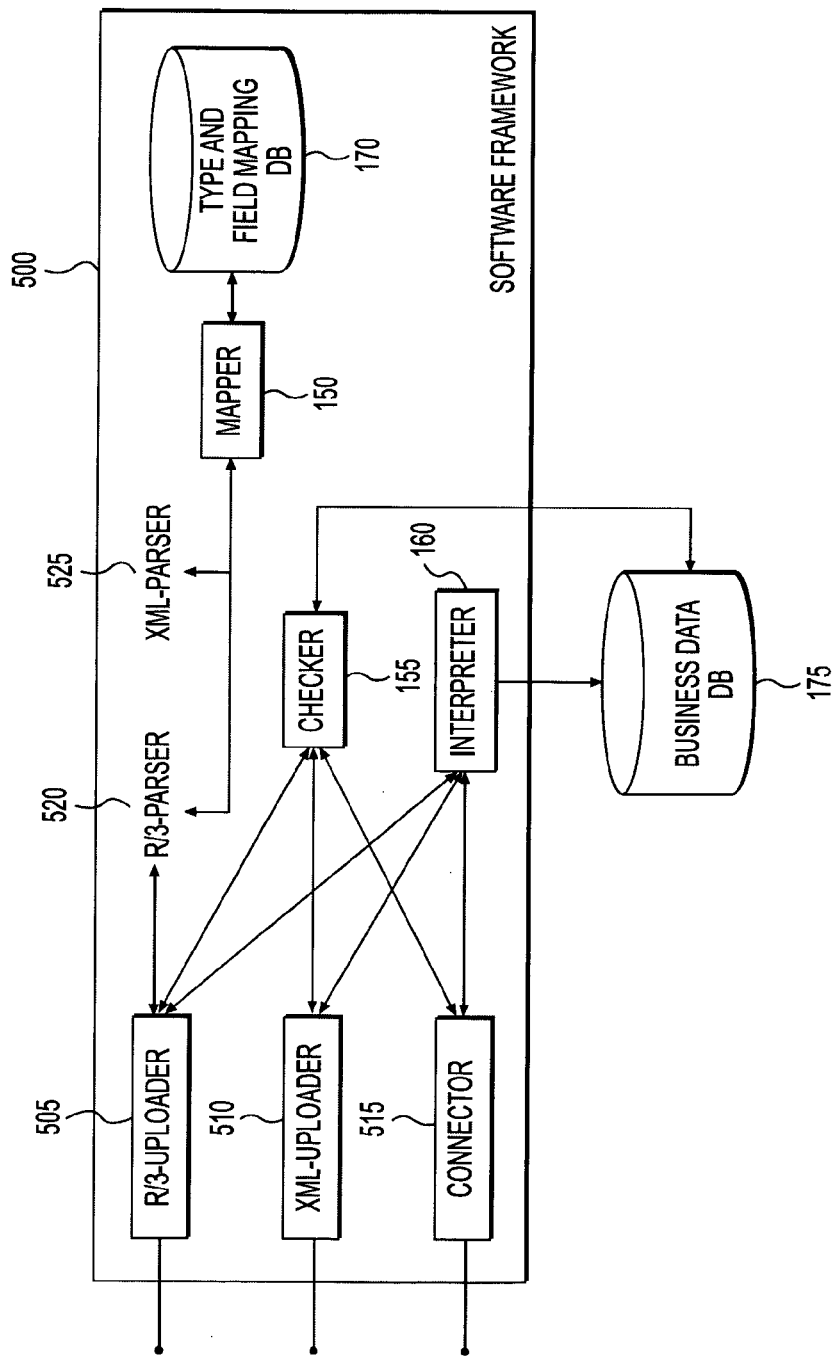
FIG. 6 is a block diagram illustrating another exemplary implementation of a data import framework, consistent with an embodiment of the present invention.

FIG. 6 is a block diagram of an exemplary implementation of a data import framework 500, consistent with an embodiment of the invention. The exemplary embodiment of FIG. 6 may be used for importing, for example, source data that is in R/3 or XML format, or provided in command language format. The implementation of data import framework 500 may be used in the embodiments of, for example, FIGS. 1 and 2. As described below the embodiment of FIG. 6 includes separate uploaders and parsers for each data format or type (R/3, XML, etc.). Where the source data is provided in command language format, a simple connector may be provided for uploading the data.

More specifically, as shown in FIG. 6, uploader software module 140 may comprise an R/3 uploader sub-module 505 and an XML uploader sub-module 510 for uploading R/3 and XML data, respectively. In addition, module 140 may include a connector uploader sub-module 515 for uploading source data provided in command language format. To parse source data in R/3 and XML format, parser software module 145 may comprise an R/3 parser sub-module 520 and an XML parser sub-module 525. Sub-modules 505, 510, 515, 520, and 525 are exemplary and uploader software module 140 and parser software module 145 may comprise any number of sub-modules corresponding to any data format or working environment.

R/3 sub-module 505 may accept source data sets from an R/3 system. These R/3 source data sets may be analyzed in R/3 parser sub-module 520 and translated into a command language, as described below. Similarly, XML uploader sub-module 510 may accept XML source data sets. These XML source data sets may be analyzed by the XML parser sub-module 525 and translated into the command language as well. In addition, connector uploader sub-module 515 may pass command language commands directly to checker software module 155. For example, a third-party application may be configured to send the source data, comprising command language commands for example, directly to costing software module 165.

Parser software module 145, including both R/3 parser sub-module 520 and XML parser sub-module 525 in this example, may use mapper software module 150. Mapper software module 150 may use type and field mappings that may be customized and stored in type and field database 170. This is because the source data may have a certain type system and costing software module 165 may have a type system different from the source data's type system. For example, R/3 source data may have various built-in types, such as "cost estimate", "material", "cost center", and "activity type". Accordingly, the R/3 source data may be transformed, within a certain transaction, into the node, edge, object, and table types used by costing software module 165, for example. Consequently, mapper software module 150 may become configured in detail according to a user's business and/or other needs.

Type mapping may define a relation between the source data types and the types used by the destination software module 165. For example, the R/3 "cost center" and "activity" type data may be mapped to "activity" nodes used by software module 165. Furthermore, field mapping may complete the type mapping on a per field basis. After the types have been assigned, field mapping may designate which source data field ends up on which target data field.

The data import framework and the costing engine may be built upon a "data definition framework" that allows the user to define the data fields and types. Particularly, the user may specify names for the fields and types that are meaningful to the user as opposed, for example, to a software programmer. This may be part of the costing engine customizing. Therefore, when importing data from a source system, the source data fields and types may be mapped to the ones defined in the destination system. This may be advantageous if the source system uses very technical fields and types which are not meaningful to the user. Table 1 illustrates exemplary mappings.

TABLE 1

|  | Source System | Destination System |
| --- | --- | --- |
| Type | M | MATERIAL |
| Type | E | ACTIVITY |
| Field | KOKRS | CO_AREA |
| Field | KOSTL | COST_CENTER |
| Field | LSTAR | ACTIVITY_TYPE |
| Field | WERKS | PLANT |
| Field | MATNR | MATERIAL NUMBER |

Once parser software module 145 creates the command language, it may send the command language to checker software module 155. Checker software module 155 may rework certain commands within the command language according to a current state of costing software module 165. For example, a command within the command language to insert an item may be changed into a command to update that item, if, for example, that item is already known to costing software module 165. In addition, as stated above, the command language may also be passed directly to checker software module 155 from connector uploader sub-module 515, if, for example, a third-party application is configured to send import commands directly to costing software module 165.

Once the command language commands are checked, they may be passed to interpreter software module 160. Interpreter software module 160 may execute the command language commands by, for example, transforming the commands into calls to a costing engine application program interface (CEAPI). Theses calls to the CEAPI may generate import data for costing software module 165 that may be stored in business database 175. The import data may be stored using costing engine network, as illustrated in FIG. 4 above. The costing engine network is exemplary, and the import data maybe stored in any number of ways.

Consistent with an embodiment of the invention, the destination for the import data may be fixed to the costing engine. Accordingly, interpreter 160 may know what commands mean and how to operate the costing engine in order to execute the commands. For example, there may be code in interpreter 160 to perform the following function:

---
"if command = 'INS_NODE' then call method costing engine >api_create_instance_node".

---

If the destination for the data import were not fixed, there may need to be another mapping of commands to operations (i.e., method or function calls, typically API calls—see below) on the destination data.

The concept of an Application Programming Interface (API) is a software design pattern generally known to those skilled in the art. For example, consider a software programmer who has built a software module. It turns out that the functions of this software module are useful not only within the specific application but also more generally. Therefore, the programmer may define a set of function calls to the module considered useful and makes them publicly available. This set may be the software module's API. From other software modules' view, using an API has the advantage that the API provider grants some stability, for example, the call parameters may not change every other time.

The CEAPI may not generate any import data in the sense that information is generated. This data may already be present along with the command. As a result of the transformation from commands to calls, the command data may become a parameter to the call. The import data may be "pipelined" from the source through the commands to the calls to the destination. Import data may be generated in the sense that data sets containing the import data may be created in the destination database.

Data source processor 105 or data import framework 110 ("the processors") included in system 100 may be implemented using a personal computer, network computer, mainframe, or other similar microcomputer-based workstation. The processors may though comprise any type of computer operating environment, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, any of the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

Network 120 may comprise, for example, a local area network (LAN) or a wide area network (WAN). Such networking environments are commonplace in offices, enterprise-wide computer networks, intranets, and the Internet, and are known by those skilled in the art. When a LAN is used as network 120, a network interface located at any of the processors may be used to interconnect any of the processors. When network 120 is implemented in a WAN networking environment, such as the Internet, the processors may typically include an internal or external modem (not shown) or other means for establishing communications over the WAN. Further, in utilizing network 120, data sent over network 120 may be encrypted to insure data security by using known encryption/decryption techniques.

In addition to utilizing a wire line communications system as network 120, a wireless communications system, or a combination of wire line and wireless may be utilized as network 120 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission.

System 100 may also transmit data by methods and processes other than, or in combination with, network 120. These methods and processes may include, but are not limited to, transferring data via, diskette, CD ROM, facsimile, conventional mail, an interactive voice response system (IVR), or via voice over a publicly switched telephone network.

Figure 7:
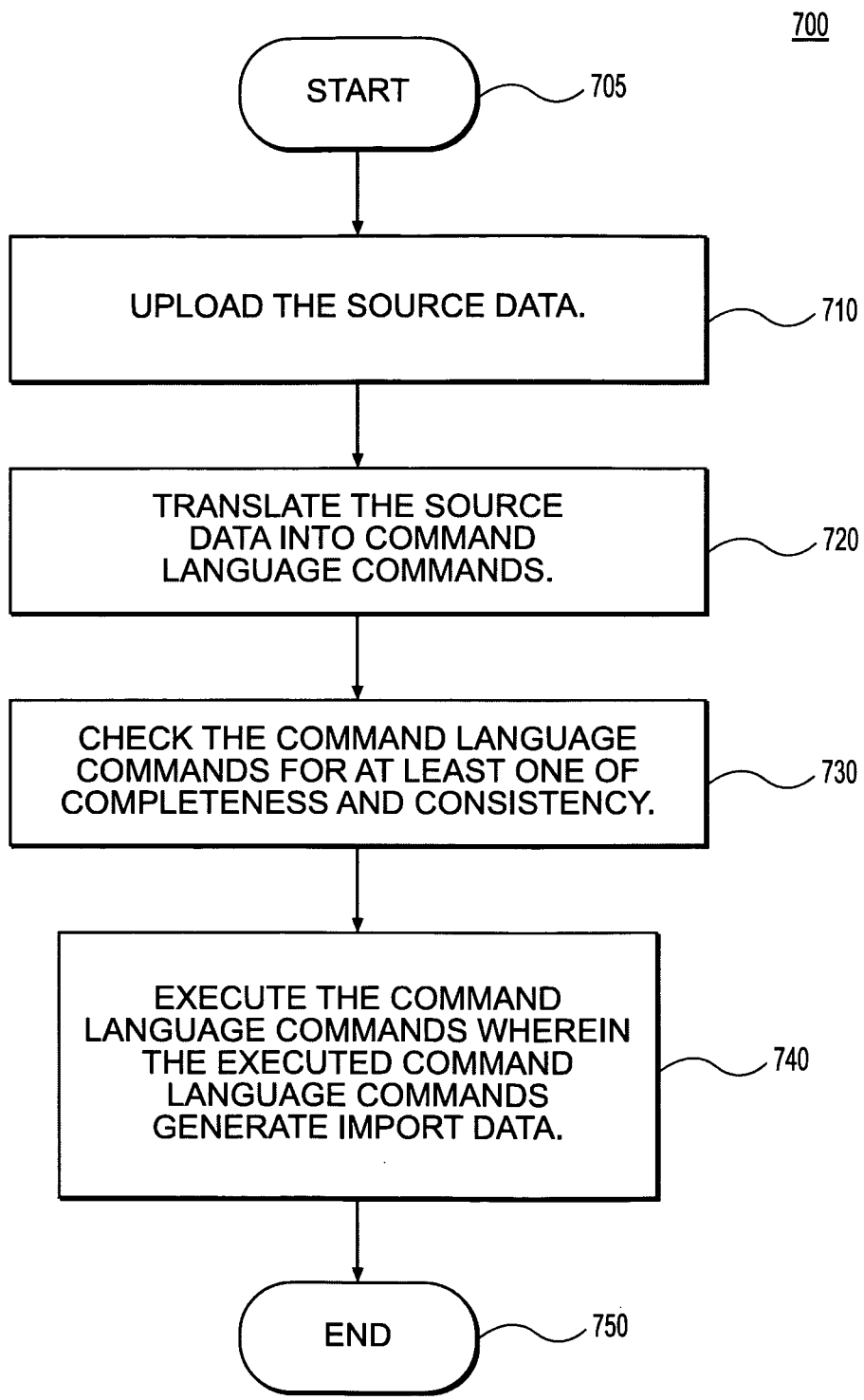
FIG. 7 is a flow chart of an exemplary method for importing source data, consistent with an embodiment of the present invention.

FIG. 7 is a flow chart of an exemplary method 700 consistent with the invention for importing source data. The exemplary method of FIG. 7 may be implemented with a data import framework, such as the data import framework 110 of FIGS. 1 and 2. Exemplary ways to implement the stages of exemplary method 700 will be described in greater detail below.

As shown in FIG. 7, exemplary method 700 may begin at starting block 705 and proceed to stage 710 where data import framework 110 may upload the source data. The source data to be uploaded may be defined and/or customized by the user. For example, import agent software module 135, when executed on processing unit 125, may display screens allowing user 115 to enter data queries and/or commands to source data processor 105 in order to import the source data. An exemplary sequence is shown in FIGS. 5A-5H, as discussed above. The source data imported by import agent software module 135 may be in any format or working environment, including R/3 and XML data. The aforementioned formats are exemplary and others may be used.

An example of source data for an R/3 cost estimate is shown in Table 2. The structural information may be encoded in the level field, for example: 1—"top level" material="product"; 2—component of the top level material="part" or "activity"; and 3—component of a level 2 component.

TABLE 2

| Level | Item Category | Plant | Material | Controlling Area | Cost Center | Activity Type | Quantity and Base Unit of Measure |
|---|---|---|---|---|---|---|---|
| 1 | M | 1000 | P-100 | 1000 | | | 100 ST |
| 2 | M | 1000 | 100-100 | 1000 | | | 100 ST |
| 3 | M | 1000 | 100-101 | 1000 | | | 200 ST |
| 3 | E | 1000 | | 1000 | 4230 | 1422 | 0.250 H |
| 2 | M | 1000 | 100-110 | 1000 | | | 200 ST |

TABLE 2-continued

| Level | Item Category | Plant | Material | Controlling Area | Cost Center | Activity Type | Quantity and Base Unit of Measure |
|---|---|---|---|---|---|---|---|
| 2 | E | 1000 | | 1000 | 4230 | 1422 | 0.250 H |
| 2 | E | 1000 | | 1000 | 4230 | 1422 | 8.250 H |

Once import agent software module 135 imports the source data, the source data may be supplied to uploader software module 140. As shown in FIG. 6, and as discussed above, uploader software module 140, may comprise R/3 uploader sub-module 505, XML uploader sub-module 510, and connector uploader sub-module 515. R/3 sub-module 505 may accept source data sets from an R/3 system. Similarly, SML uploader sub-module 510 may accept XML source data sets. In addition, connector uploader sub-module 515 may pass command language commands directly to checker software module 155. For example, a third-party application may be configured to send the source data, comprising command language commands for example, directly to costing software module 165.

From stage 710, where data import framework 110 uploads the source data, exemplary method 700 may advance to stage 720 where data import framework 110 may translate the source data into command language commands. For example, as shown in FIG. 6 and discussed above, parser software module 145 may comprise R/3 parser sub-module 520 and XML parser sub-module 525. R/3 source data sets may be analyzed in R/3 parser sub-module 520 and translated into a command language. Similarly, XML source data sets may be analyzed by the XML parser sub-module 525 and translated into the command language as well. Parser software module 145, including both R/3 parser sub-module 520 and XML parser sub-module 525 in this example, may use mapper software module 150. As discussed above, mapper software module 150 may use type and field mappings that may be customized and stored in type and field database 170. If the source data is provided in command language format, then step 720 may be skipped and the source data may be passed directly to the checker for analysis (i.e., step 730).

The data in Table 2 may be processed into the follow command sequence shown in Table 3.

TABLE 3

| Command Name | The Result Of The Type Mapping | Reference Identifier | Reference Identifiers To Build Up A Network | Reference Identifiers To Build Up A Network | Result Of The Field Mapping |
|---|---|---|---|---|---|
| INS_OBJ | MATERIAL | 1 | 0 | 0 | data compartment |
| INS_NODE | NODE | 2 | 1 | 0 | data compartment |
| INS_EDGE | EDGE | 3 | 2 | 0 | data compartment |
| INS_OBJ | MATERIAL | 4 | 0 | 0 | data compartment |
| INS_NODE | NODE | 5 | 4 | 0 | data compartment |
| INS_EDGE | EDGE | 6 | 5 | 2 | data compartment |
| INS_OBJ | MATERIAL | 7 | 0 | 0 | data compartment |
| INS_NODE | NODE | 8 | 7 | 0 | data compartment |

TABLE 3-continued

| Command Name | The Result Of The Type Mapping | Reference Identifier | Reference Identifiers To Build Up A Network | Reference Identifiers To Build Up A Network | Result Of The Field Mapping |
|---|---|---|---|---|---|
| INS_EDGE | EDGE | 9 | 8 | 5 | data compartment |
| INS_OBJ | ACTIVITY | 10 | 0 | 0 | data compartment |
| INS_NODE | NODE | 11 | 10 | 0 | data compartment |
| INS_EDGE | EDGE | 12 | 11 | 5 | data compartment |
| INS_OBJ | ACTIVITY | 13 | 0 | 0 | data compartment |
| INS_NODE | NODE | 14 | 13 | 0 | data compartment |
| INS_EDGE | EDGE | 15 | 14 | 2 | data compartment |
| INS_OBJ | ACTIVITY | 16 | 0 | 0 | data compartment |
| INS_NODE | NODE | 17 | 16 | 0 | data compartment |
| INS_EDGE | EDGE | 18 | 17 | 2 | data compartment |
| INS_OBJ | ACTIVITY | 19 | 0 | 0 | data compartment |
| INS_NODE | NODE | 20 | 19 | 0 | data compartment |
| INS_EDGE | EDGE | 21 | 20 | 2 | data compartment |

An exemplary data compartment may comprise:

MATERIAL | P-100
PLANT | 1000
CO_AREA | 1000
UNIT | ST

Once data import framework 110 translates the source data into command language commands in stage 620, exemplary method 700 may continue to stage 630 where data import framework 110 may check the command language commands for at least one of completeness and consistency. For example, checker software module 155 may rework certain commands within the command language according to a current state of costing software module 165. For example, a command within the command language to insert an item may be changed into a command to update that item, if, for example, that item is already known to costing software module 165. In addition, as stated above, the command language may also be passed directly to checker software module 155 from connector uploader sub-module 515, if, for example, a third-party application is configured to send import commands directly to costing software module 165.

As illustrated in Table 4, if the above example is a re-import (i.e., all positions are already known to costing software module 165), checker 155 may transform the command sequence to that illustrated in Table 5 below. (For example, INS=insert becomes UPD=update.) Checker 155 may re-sorts the command according to internal algorithmic reasons.

TABLE 5

| Command Name | The Result Of The Type Mapping | Reference Identifier | Reference Identifiers To Build Up A Network | Reference Identifiers To Build Up A Network | Result Of The Field Mapping |
|---|---|---|---|---|---|
| UPD OBJ | MATERIAL | 1 | 0 | 0 | data compartment |
| UPD OBJ | MATERIAL | 4 | 0 | 0 | data compartment |
| UPD OBJ | MATERIAL | 7 | 0 | 0 | data compartment |
| UPD OBJ | ACTIVITY | 10 | 0 | 0 | data compartment |
| UPD OBJ | ACTIVITY | 13 | 0 | 0 | data compartment |
| UPD OBJ | ACTIVITY | 16 | 0 | 0 | data compartment |
| UPD OBJ | ACTIVITY | 19 | 0 | 0 | data compartment |
| UPD NODE | NODE | 2 | 1 | 0 | data compartment |
| UPD NODE | NODE | 5 | 4 | 0 | data compartment |
| UPD NODE | NODE | 8 | 7 | 0 | data compartment |
| UPD NODE | NODE | 11 | 10 | 0 | data compartment |
| UPD NODE | NODE | 14 | 13 | 0 | data compartment |
| UPD NODE | NODE | 17 | 16 | 0 | data compartment |
| UPD NODE | NODE | 20 | 19 | 0 | data compartment |
| UPD EDGE | EDGE | 3 | 2 | 0 | data compartment |
| UPD EDGE | EDGE | 6 | 5 | 2 | data compartment |
| UPD EDGE | EDGE | 9 | 8 | 5 | data compartment |
| UPD EDGE | EDGE | 12 | 11 | 5 | data compartment |
| UPD EDGE | EDGE | 15 | 14 | 2 | data compartment |
| UPD EDGE | EDGE | 18 | 17 | 2 | data compartment |
| UPD EDGE | EDGE | 21 | 20 | 2 | data compartment |

After data import framework 110 checks the command language commands in stage 630, exemplary method 600 may proceed to stage 640 where data import framework 110 may execute the command language commands, wherein the executed command language commands generate import data. For example, interpreter software module 160 may execute the command language commands by, for example, transforming the commands into calls to a costing engine application program interface (CEAPI). As discussed above, these calls to the CEAPI may generate import data for costing software module 165 that may be stored in business database 175. The import data may be stored using costing engine network as illustrated in FIG. 4 above. The costing engine network is exemplary, and the import data maybe stored in other ways.

Within costing software module 165, objects (OBJ), nodes (NODE), and edges (EDGE) may be polymorphically referred to as "elements". All commands in Table 5 above may end up in calls of the form:

element->api_set_values(it_value=<data compartment>.

An INS_OBJ command may be executed by calling, for example:

costing_engine->api_create_instance_object
        (it_value=<data compartment>.

After data import framework 110 execute the command language commands in stage 740, exemplary method 700 may then end at stage 750. The exemplary method 700 may be repeated for additional sets of data to be imported or on a predetermined cycle defined by a user.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for importing non-executable source data to determine estimated costs of product life cycles, the method comprising the following steps performed by one or more processors:
    receiving a selection of the non-executable source data by a user via a graphical user interface;
    translating the non-executable source data into command language commands that are executable, wherein the translating is based on mappings defined by the user using the graphical user interface;
    checking the command language commands for at least one of completeness or consistency;
    executing the command language commands by transforming the commands into calls to an application program interface configured to perform concurrent costing;
    receiving import data, generated by the calls to the application program interface, the import data being configured for use in determining a cost of a material in a product life cycle; and
    storing the import data in a database.

2. The method of claim 1, further comprising uploading the source data.

3. The method of claim 2, wherein uploading the source data comprises uploading the source data from a source system.

4. The method of claim 1, wherein the source data is in at least one of an extensible markup language (XML) or a SAP R/3 format.

5. The method of claim 1, wherein translating the source data into command language commands further comprises using at least one of type mappings or field mappings.

6. The method of claim 5, wherein using type mappings comprises defining a relationship between at least one source data type or application program data type.

7. The method of claim 5, wherein using field mappings comprises defining a relationship between at least one source data field or application program data field.

8. The method of claim 5, wherein at least one of the type mappings or the field mappings are customized by a user.

9. The method of claim 1, wherein checking the command language commands further comprises reworking at least one of the command language commands.

10. The method of claim 9, wherein reworking at least one of the command language commands comprises reworking at least one of the command language commands based on a current state of an application program.

11. The method of claim 10, wherein the current state of the application program includes whether a data element is already known by the application program.

12. The method of claim 1, wherein the import data comprises at least one of a node or an edge.

13. The method of claim 12, wherein the node comprises a container for at least one of structure information or network data.

14. The method of claim 1, wherein the source data comprises a plurality of tables.

15. The method of claim 14, wherein at least one of the tables includes at least one of structure information, pointers to further data, or proper data contents.

16. The method of claim 14, wherein at least one of the plurality of tables includes at least one of a leading data table or a dependent data table.

17. A system for importing non-executable source data to determine estimated costs of product life cycles, the system comprising:
a memory storage for maintaining a database; and
a processing unit coupled to the memory storage, wherein the processing unit is operative to:
receive a selection of the non-executable source data by a user via a graphical user interface;
translate the non-executable source data into command language commands that are executable, wherein the translating is based on mappings defined by the user using the graphical user interface;
check the command language commands for at least one of completeness or consistency; and
execute the command language commands by transforming the commands into calls to an application program interface configured to perform concurrent costing;
receive import data, generated by the calls to the application program interface, the import data being configured for use in determining a cost of a material in a product life cycle.

18. The system of claim 17, wherein the processing unit is further operative to upload the source data.

19. The system of claim 18, wherein the processing unit is further operative to upload the source data from a source system.

20. The system of claim 17, wherein the source data is in at least one of an extensible markup language (XML) or a SAP R/3 format.

21. The system of claim 17, wherein the processing unit being operative to translate the source data into command language commands further comprises the processing unit being operative to use at least one of type mappings or field mappings.

22. The system of claim 21, wherein the processing unit being operative to use type mappings comprises the processing unit being further operative to define a relationship between at least one source data type application program data type.

23. The system of claim 21, wherein the processing unit being operative to use field mappings comprises the processing unit being further operative to define a relationship between at least one source data field and or application program data field.

24. The system of claim 21, wherein at least one of the type mappings or the field mappings are customized by a user.

25. The system of claim 17, wherein the processing unit being operative to check the command language commands comprises the processing unit being operative to rework at least one of the command language commands.

26. The system of claim 25, wherein the processing unit is further operative to rework at least one of the command language commands based on a current state of an application program.

27. The system of claim 26, wherein the current state of the application program includes whether a data element is already known by the application program.

28. The system of claim 17, wherein the import data comprises at least one of a node or an edge.

29. The system of claim 28, wherein the node comprises at least one of a container for structure information or network data.

30. The system of claim 17, wherein the source data comprises a plurality of tables.

31. The system of claim 30, wherein at least one of the tables includes at least one of structure information, pointers to further data, or proper data contents.

32. The system of claim 30, wherein at least one of the tables includes at least one of a leading data table or a dependent data table.

33. A non-transitory computer-readable medium which stores a set of instructions which when executed by at least one processor performs a method for importing non-executable source data to determine estimated costs of product life cycles, the method executed by the at least one processor with the set of instructions comprising:
receiving a selection of the non-executable source data by a user via a graphical user interface;
translating the non-executable source data into command language commands that are executable, wherein the translating is based on mappings defined by the user using the graphical user interface;
checking the command language commands for at least one of completeness or consistency;
executing the command language commands by transforming the commands into calls to an application program interface configured to perform concurrent costing;
receiving import data, generated by the calls to the application program interface, the import data being configured for use in determining a cost of a material in a product life cycle; and
storing the import data in a database.

34. The computer-readable medium of claim 33, further comprising uploading the source data.

35. The computer-readable medium of claim 34, wherein uploading the source data comprises uploading the source data from a source system.

36. The computer-readable medium of claim 33, wherein the source data is in at least one of an extensible markup language (XML) or a SAP R/3 format.

37. The computer-readable medium of claim 33, wherein translating the source data into command language commands further comprises using at least one of type mappings or field mappings.

38. The computer-readable medium of claim 37, wherein using type mappings comprises defining a relationship between at least one source data type or application program data type.

39. The computer-readable medium of claim 37, wherein using field mappings comprises defining a relationship between at least one source data field or application program data field.

40. The computer-readable medium of claim 37, wherein at least one of the type mappings or the field mappings are customized by a user.

41. The computer-readable medium of claim 33, wherein checking the command language commands further comprises reworking at least one of the command language commands.

42. The computer-readable medium of claim 41, wherein reworking at least one of the command language commands comprises reworking at least one of the command language commands based on a current state of an application program.

43. The computer-readable medium of claim 42, wherein the current state of the application program includes whether a data element is already known by the application program.

44. The computer-readable medium of claim 33, wherein the import data comprises at least one of a node or an edge.

45. The computer-readable medium of claim 44, wherein the node comprises at least one of a container for structure information or network data.

46. The computer-readable medium of claim 33, wherein the source data comprises a plurality of tables.

47. The computer-readable medium of claim 46, wherein at least one of the tables includes at least one of structure information, pointers to further data, or proper data contents.

48. The computer-readable medium of claim 46, wherein at least one of the tables includes at least one of a leading data table or a dependent data table.

* * * * *